United States Patent [19]

Tupaj et al.

[11] 3,710,035

[45] Jan. 9, 1973

[54] HOUSING AND SPEAKER ARRANGEMENT FOR MAGNETIC SOUND RECORDING AND REPRODUCTION DEVICE

[75] Inventors: Manfred Paul Tupaj, Grobenzell; Heinz Engert, Munich, both of Germany

[73] Assignee: Sud-Atlas-Werke G.m.b.H., Munich, Germany

[22] Filed: Oct. 26, 1970

[21] Appl. No.: 83,802

[30] Foreign Application Priority Data

Feb. 7, 1970 Germany.....................P 20 05 641.1

[52] U.S. Cl. .................................179/100.2 Z, 274/2

[51] Int. Cl.........G11b 23/04, G11b 5/00, G11b 1/00

[58] Field of Search....179/100.1 R, 100.11, 100.2 Z, 179/100.12; 312/DIG. 15; 274/2

[56] References Cited

UNITED STATES PATENTS

| | | | |
|---|---|---|---|
| 3,521,010 | 7/1970 | Sato | 179/100.2 Z |
| 3,104,289 | 9/1963 | Segel | 179/100.1 R |
| 2,878,375 | 3/1959 | Schachtel | 312/7 R |
| 3,475,066 | 10/1969 | Billingsley | 312/7 R |
| 3,135,835 | 6/1964 | Steindinger | 179/100.1 TD |
| 2,049,039 | 7/1936 | Ansley | 312/8 R |
| 2,559,354 | 7/1951 | Gauthier | 179/100.11 |

*Primary Examiner*—James W. Moffitt
*Assistant Examiner*—Raymond F. Cardillo, Jr.
*Attorney*—McGlew and Toren

[57] ABSTRACT

A device for magnetic sound recording and reproduction includes a housing arranged to receive a sound tape cassette and a speaker unit detachably connected to one surface of the housing. The speaker unit contains projecting plug pins which fit into sockets in the housing of the device for securing the speaker unit in place. The speaker unit may cover one lateral surface of the housing or, if a larger speaker is to be used, it may cover a face surface and project over and be connected into a lateral surface of the housing. Additional sockets of plug connections can be provided in the housing to connect a microphone, speaker, record player and the like.

2 Claims, 7 Drawing Figures

INVENTORS
Heinz ENGERT
By MANFRED PAUL TUPAJ
Mc Glew and Toren
his ATTORNEY

HOUSING AND SPEAKING ARRANGEMENT FOR MAGNETIC SOUND RECORDING AND REPRODUCTION DEVICE

SUMMARY OF THE INVENTION

The present invention is directed to a device for magnetic sound recording and reproduction and, more particularly, it is concerned with a housing for such a device arranged to receive a sound tape cassette, a driving mechanism for the tape, and an electric amplifier and in addition, a loudspeaker is arranged to be detachably connected to one lateral surface of the housing.

In addition to cassette tape recorders with a loudspeaker incorporated into the recorder housing, tape recorders are also known in which the loudspeaker is plugged into the housing and in such an arrangement the recorder may be used either without the speaker as a recording device of reduced dimensions,or it may be used in connection with the speaker as a reproducer. Preferably, a miniature speaker is employed which is incorporated in an independent speaker housing having a cross sectional shape and size similar to the recorder housing and extending in the longitudinal direction of the housing with the speaker being plugged into the housing. However, when such apparatus is utilized, the deficiency in low frequency reproduction of the miniature speaker often requires the use of an independent or additional larger speaker and such addition necessitates more complicated wiring and handling difficulties in transit.

Therefore, the primary object of the present invention is to avoid the disadvantages experienced in known tape recorder constructions and to provide a common unitary structure with the optional use of a small speaker or one of a larger size.

In accordance with the present invention, a cassette tape recorder device includes a housing with a speaker unit removably mounted on a lateral surface of the housing. The speaker unit may extend over the front or rear surface of the housing and may be of optional size or height, however, preferably it is formed of a shape and size to conform to the housing. Accordingly, the tape recorder device may be used either with a miniature speaker plugged into one of its lateral surfaces or with a larger speaker positioned on and plug connected to the housing. The connections between the housing and the speaker unit assure a compact unitary structure which is simple to handle and to transport. Further, the device can be used without a speaker unit and its socket connections can be employed for connecting other units, such as a microphone for providing a recording device of reduced dimensions, since due to its size, it can be carried in a pocket. By separating the housing from the speaker unit, it is possible to insert the housing into a pocket-like compartment or casing, for example, in the dashboard of a vehicle which incorporates plug connections for coupling the housing to an independent speaker system within the vehicle.

In one form of the invention, socket connections for the arrangement can be provided as pins secured to the housing of the speaker unit which cooperate with sockets located in the housing of the tape recorder device,and the connecting means on the device being arranged to locate a miniature speaker housing provided with an extension molded on its casing which may also act as a support for its connecting pins. Further, in accordance with the invention, the speaker unit casing is arranged to incorporate an amplifier stage and/or a set of batteries or the like for a larger speaker. Moreover, the plug or connecting pins or bushes may form electric contacts or they may be provided with contact plates, contact rails and the like. Additionally, in place of plug pins and cooperating sockets, push buttons may be utilized to afford the electric connections.

To use the speaker unit separately from the tape recorder device, the casing of the speaker unit may include a removable wound-up connecting cable with a socket connector. Further, additional socket connections are provided on the tape recorder device housing for the connection of a speaker, microphone, record player and power means, so that it may be used with such additional members.

The invention is not restricted to any particular design of the speaker unit casing and, furthermore, a speaker casing may be mounted on a device in which a speaker is incorporated, or which has a built-in speaker in addition to the miniature speaker casing.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated preferred embodiments of the invention.

DETAILED DESCRIPTION OF THE INVENTION

Figures 1, 2, 3, 4, 5, 6, 7:
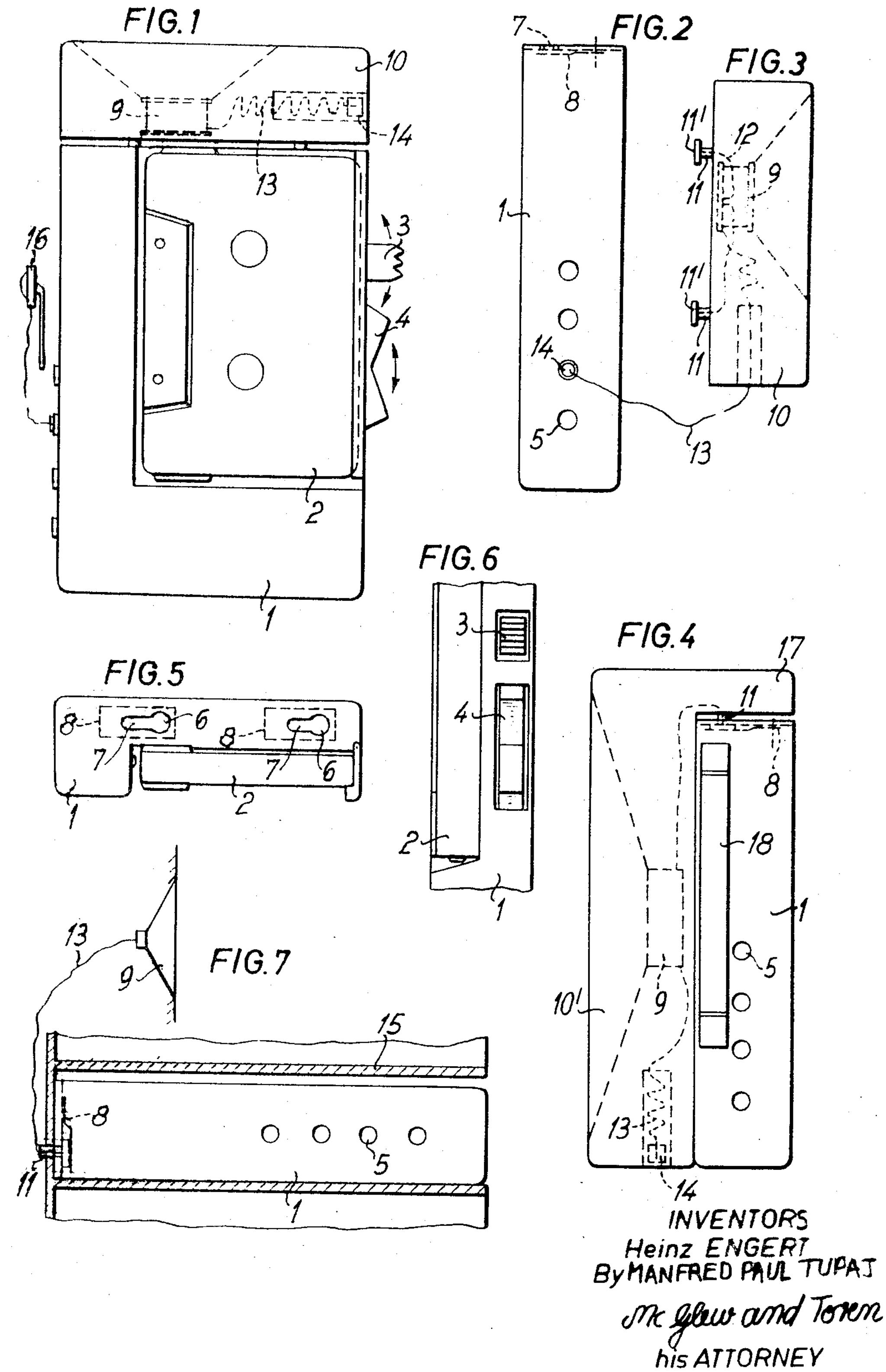
FIG. 1 is a plan view of a tape recorder device having a speaker unit casing containing a miniature speaker and a microphone connected to it.
FIG. 2 is a side view of the housing of the device shown in FIG. 1.
FIG. 3 is a side view of the speaker unit casing illustrated in FIG. 1.
FIG. 4 is a side view of the tape recorder device with another speaker unit casing mounted on it.
FIG. 5 is a view of the surface of the tape recorder device housing to which the speaker unit casing is attached.
FIG. 6 is a partial side view of the tape recorder device.
FIG. 7 is a sectional view of the tape recorder device inserted into a receiving compartment.

In FIG. 1, a tape recorder device housing 1 acts as a holder for a sound tape cassette 2 and includes a driving mechanism for the tape, not shown in detail, an electric amplifier and a set of batteries. Along one of its lateral surfaces, the housing 1 contains a rocker switch button 3 (see FIGS. 1 and 6) for switching between the operating positions "stop - recording - reproduction," and a switch button 4 for changing over between rapid forward and reverse motion of the tape. On the opposite lateral surface of the housing 1, socket bushes 5 are provided for connections to power means (for battery charging), as well as to a record player, microphone, speaker and the like. Further in FIG. 1, a speaker unit casing or housing 10 is detachably pin-connected to the adjacent lateral surface of the housing 1. The casing 10 has a cross sectional size and shape which corresponds to the adjacent lateral end surface of the housing 1 and it contains a miniature speaker 9.

As shown in FIG. 3, the pin connection of the speaker unit casing 10 to the housing 1 is effected by socket or plug pine 11 which project from one surface of the casing and are provided with widened portions 11' at their outer ends. For connecting the casing 10 to the housing 1, the pins 11 are engaged within apertures 6 in the housing 1, note FIG. 5. The apertures 6 include a clamping slot 7 so that the widened portions 11' can be inserted into the apertures 6 and then by displacing the casing 10 laterally the pins 11 are secured within the clamping slots 7. The combined apertures 6 and clamping slots 7 are located over contact plates 8, see FIG. 5, and the plates are connected to the electric amplifier in the housing so that an electrical connection between the speaker unit and the amplifier is effected automatically via the conductors in the speaker unit casing when the socket pins are inserted into the combined apertures and clamping slots.

The device shown in FIG. 1, may be connected directly to the speaker 9 or, as displayed in FIGS. 2 and 3,the device and speaker may be connected by means of a connecting cable 13 and a connecting socket 14. Further, the device can also be used without a speaker unit, such as for sound recording. By removing the speaker unit casing 10, the small size of the tape recorder device housing 1 permits it to be carried in a coat pocket and the like and to be used in connection with a miniature microphone 16, note FIG. 1, which miniature microphone may serve either to make sound recordings or as a sound reproduction device. Furthermore, as shown in FIG. 7, it is possible to insert the housing 1 into a compartment or pocket 15, such as in the dashboard of an automotive vehicle, and to connect it to plug pins 11 located within the pocket 15. As shown in FIG. 7, the pins 11 are connected to a speaker installation of a wireless receiver by means of a connecting cable already provided within the automotive vehicle.

In place of the speaker unit casing 10 shown in FIG. 1, the tape recorder device housing can be combined with a larger size speaker unit having a casing 10' containing a larger speaker, as shown in FIG. 4. The speaker unit casing 10' covers one of the face surfaces of the housing 1 and projects over the lateral surface of the housing into which it is connected. The casing 10' is shaped to correspond to the dimensions of the surfaces of the housing 1 opposite which it is positioned when mounted on the housing. To utilize the apertures 6 and clamping slots 7 of the housing 1, the casing 10' has an extension which projects downwardly over the lateral surface of the housing and provides the requisite connection by means of the plug pins 11. Due to the interengagement of the plug pins 11 in the combined apertures and connecting slots 6, 7, the casing 10' is firmly but detachably connected to the housing 1 and the speaker unit casing 10' in combination with the housing 1 forms a compact unit which can be carried by means of a handle 18. The connecting cable 13 for the speaker 9 in the casing 10' can be stowed away in the casing and permits the casing 10' or the speaker 9 to be erected and used as a separate unit.

We claim:

1. Portable magnetic sound recording and reproducing means comprising, in combination, a housing for containing recording and reproducing components including tape driving mechanisms, and amplifier and batteries, for cooperation with the tape cassette; said housing having substantially rectangular top and bottom walls, relatively elongated side walls and end walls extending between said side walls and being formed with a recess to conformingly receive a tape cassette; one of said end walls being formed with a pair of longitudinally spaced and aligned keyhole slots; respective contact plates in said housing beneath each slot and electrically connected to the components in said housing; one side wall having jack means connected to the components in said housing and arranged to receive plugs on devices connectible to said housing; the other side wall having manually operable operating mode selecting controls; a casing containing a small loudspeaker and having a side wall of s size and shape corresponding to said one end wall, said casing side wall having a pair of headed pins connected to said small loudspeaker and arranged to be inserted into said keyhole slots and into engagement with the respective contact plates; said casing being disengageably connected to said one housing end wall, to form a conforming extension of said housing, by inserting said headed pins into the wider portions of said keyhole slots and sliding said casing to move said pins into the narrower portions of said keyhole slots; a cord connected to said loudspeaker and receivable in a recess in said casing; and plug means on the end of said cord engageable in a selected jack means; whereby said loudspeaker is selectively securable, electrically and mechanically to said housing, or connected electrically to said housing and positioned remotely therefrom.

2. Portable magnetic sound recording and reproducing means, as claimed in claim 1, including a second casing containing a large loudspeaker and having a first wall of a size and shape corresponding to one of said top and bottom walls of said housing and a second wall substantially perpendicular to said first wall and of a size and shape corresponding to said one end wall of said housing, said second wall having a pair of headed pins connected to said large loudspeaker and arranged to be inserted into said keyhole slots and into engagement with the respective contact plates; said second casing being disengageably connected to said housing, to form a conforming extension of said housing, by placing said first wall against said one of said top and bottom walls and said second wall adjacent said one end wall of said housing and inserting said headed pins into the wider portions of said key hole slots and sliding said second casing to move said pins into the narrower portions of said keyhole slots; a second cord connected to said large loudspeaker and receivable in a recess in said second casing; and second plug means on the end of said second cord engageable in a selected jack means; whereby said large loudspeaker is selectively securable, electrically and mechanically, to said housing, or connected electrically to said housing and positioned remotely therefrom.

* * * * *